United States Patent [19]

Sukhov et al.

[11] 3,742,815
[45] July 3, 1973

[54] METHOD OF MACHINING GROOVES IN ROLLS OF HOT PILGER MILLS

[76] Inventors: Ivan Alexeevich Sukhov, Pudozhskaya ulitsa, 4a, kv. 22; Igor Nikolaevich Soloviev, ulitsa Stoikosti, 2/11, kv. 227, both of Leningrad, U.S.S.R.

[22] Filed: Nov. 3, 1971

[21] Appl. No.: 195,186

[30] Foreign Application Priority Data
Oct. 18, 1969  U.S.S.R. ............................. 1374899
Oct. 18, 1969  U.S.S.R. ............................. 1374903

[52] U.S. Cl. ...................... 90/11 C, 90/13.9, 90/20, 90/15, 90/29
[51] Int. Cl. ........ B23c 1/04, B23c 1/12, B23c 1/18, B23c 3/34
[58] Field of Search ...................... 90/11 C, 20, 29, 90/13.3, 13.6, 13.9, 15

[56] References Cited
FOREIGN PATENTS OR APPLICATIONS
1,179,438   10/1964   Germany ............................ 90/13.9

Primary Examiner—Francis S. Husar
Attorney—Holman & Stern

[57] ABSTRACT

While the roll being machined is in a rotary feed movement, and its groove arcuate central portion is machined by a tool rotated around a fixed geometrical center of the arc defining the central portion and subsequently receiving a radial feed, the bevel flanks conjugate with the profile central portion are machined alternatively by a shank cutter which is rotated in the groove radial section plane and simultaneously moved in the radial direction until the bevel flank being machined conjugates with the arc of the groove central portion. For this purpose, a slide housing the revolving table operatively associated with the roll drive and carrying guideways with a cutter head and a cutter mounted therein is arranged on the bed at its one side with respect to the means the for accommodation of the roll being machined, and a post having vertical guideways with a means for clamping the tool holder mounted therein is arranged at the other opposite side of the bed.

2 Claims, 7 Drawing Figures

METHOD OF MACHINING GROOVES IN ROLLS OF HOT PILGER MILLS

BACKGROUND OF THE INVENTION

The present invention relates to the manufacture of tools for pilger mills, and more particularly to methods of machining grooves in rolls of hot pilger mills and to machines for effecting such methods.

PRIOR ART

Commonly known are methods of machining grooves in rolls of hot pilger mills wherein the groove contour varies as the roll is rotated in the machining zone and has an arc-defined central portion which is conjugated with bevel flanks in each radial section. These known methods make use of grooving the roll by turning it throughout the machining area. Various machines for effecting these methods have been proposed.

The prior art machines have a revolving table mounted on a bed, means for the accommodation of the roll being grooved and a drive for rotating same, and means for clamping a tool holder with a tool, said clamping means being mounted directly on the revolving table.

The revolving table carrying the tool holder is mounted in front of the means for the accommodation of the roll being grooved. The table and tool holder are driven by servo drives controlled by copying mechanisms rotating in synchronism with the roll.

During machining of the groove contour central portion defined by the arc or "bellmouth," when the roll being grooved is rotated with the cutting speed, the tool receives the rotary feed motion simultaneously with the linear copying motion in the opposite direction with reference to the table axis of rotation.

The groove bevel flanks are machined in a similar manner except for an additional correction motion of the tool to make for the bevel flank angle variation.

Thus, the roll groove is machined by a single tool along the whole contour or profile with the roll rotating at the cutting speed, i.e., by turning.

The prior art machines have the following disadvantages:

1. The copying motion coincides with the main cutting motion (with the roll being grooved rotating), and this results in the availability of low cutting speeds limited by linear copying motion speeds determined by the slope of the roll cross section, thus considerably increasing the roll grooving time.

2. The cutting is carried out along the groove circumference, and its slope requires that the tool should be sharpened with a back angle of 35° to 38°. This practically excludes the possibility of using of carbide faced tools. As a result, the tool wear resistance is reduced, and the tool wear causes the groove contour distortion and badly affects the surface finish. The groove will require a further additional finishing by grinding. Otherwise, the distorted groove contour or profile will lead to wall thickness variations in the milled pipes or tubes.

3. The groove contour bevel flanks are machined by a tool in a number of operations, and this also results in increasing the roll grooving time.

4. The grooving of rolls by turning does permit the control of the roll groove dimensions during machining and the introduction of corrections to compensate for the tool wear, since in each groove radial section the complete contour may be obtained only after machining the whole groove surface.

5. The complexity and length of mechanical means transferring the motion from master mechanisms to the tool and comprising correction members do not provide for the required static and dynamic rigidity of feeding drives, thus reducing the accuracy and lowering the surface finish of the roll groove.

6. Besides, it should be noted that known machines cannot groove rolls having bevel flanks comprising substantially inclined straight-line portions, each being conjugated with contour central portion by an additional arc.

OBJECTS AND SUMMARY OF THE INVENTION

It is a primary object of the present invention to provide a method of machining grooves in rolls of hot pilger mills and a machine for effecting this method, wherein the tools and motions employed will provide for higher accuracy and better surface finish of the machined roll groove without additional grinding, as well as higher production rates.

In accordance with the above and other objects there is provided a method wherein, according to the invention, while the roll being grooved is in rotary feed movement its groove contour central portion defined by the arc is machined by a tool rotated around a fixed geometrical center of this arc, and as the radius varies in subsequent radial sections of the groove, the tool is radially fed and the bevel flanks are alternatively machined by a shank cutter which is rotated around said geometrical center in the radial section plane of said groove and simultaneously moved in the radial direction until the bevel flank being machined conjugates with the arc of said groove central portion in accordance with the bevel flank angle variation.

In the case when bevel flanks of the groove contour comprise inclined straight line portions, each being conjugated with the contour central portion by means of an additional arc, these additional arcs are machined simultaneously by a tool rotated around the geometrical center common for these arcs, said center being movable in the radial direction with reference to the axis of roll rotation, and a radial feed is imparted to the tool as the radius of additional arcs varies in the process of the roll rotation.

The present invention provides a machine for effecting the above-described method comprising a revolving table, means for the accommodation of the roll being grooved and a drive for rotating said roll and means for clamping a tool holder all mounted on a bed. According to the invention, a slide for the accommodation of the revolving table has an operative connection with the drive for rotating said roll and carrying guideways with a cutter head and a cutter mounted in said guideways is arranged on the bed in horizontal guideways at one side thereof with respect to the means for the accommodation of the roll being grooved, and a post having vertical guideways with a means for clamping a tool holder mounted in said vertical guideways, said clamping means comprising a boring head having a spindle and a chuck with guideways for the accommodation of a chuck rest which carries said tool holder and is operatively associated with the drive for rotating said roll, is arranged at the other opposite side of the bed.

The cutter head with a cutter adapted for travelling in the revolving table guideways preferably has an independent drive operating in response to signals from a cutter position sensor arranged at the cutter end and contacting the arc of the groove central portion.

The machine is provided with copying devices or masters adapted for rotation in synchronism with the roll being grooved and master angle sensors contacting said masters and controlling the rotation of the table and movements of the chuck rest and boring head by means of servo drives.

The present method of grooving rolls for hot pilger mills and the machine for effecting this method provide for higher accuracy and better surface finish of the machined roll groove without additional grinding and higher production rates, and in addition to it permit the machining of roll grooves having a progressive or stepped profile which greatly improves the pilger mill productive capacity.

The present invention can be best understood from reading the following description of the particular embodiment with due reference to the accompanying drawings, wherein:

DETAILED DESCRIPTION OF THE INVENTION

Figure 1:
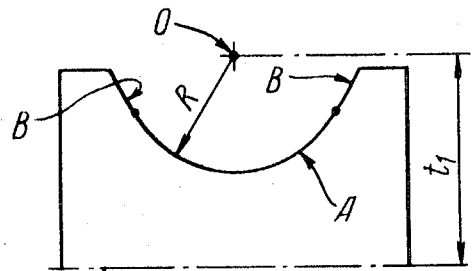
FIG. 1 is a schematic view of the groove contour comprising an arc-defined central portion conjugated with bevel flanks taken in the roll radial section.

A method is provided for grooving rolls for hot pilger mills with the groove contour varying as the roll is rotated in the machining zone and having a central portion A defined by radius R and conjugated with bevel flanks in each radial section (FIG. 1).

Figure 2:
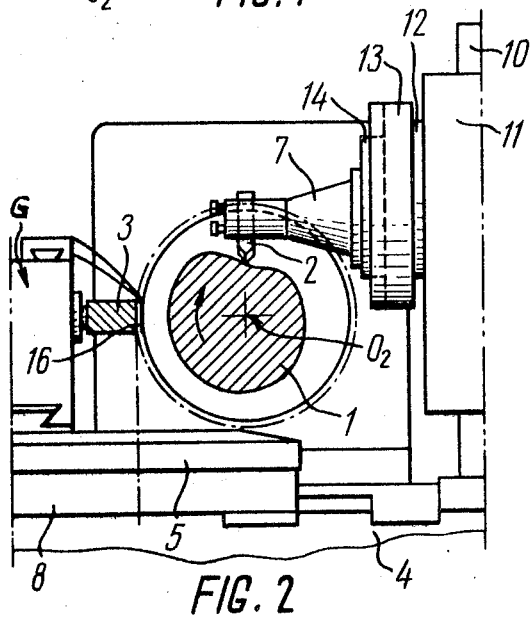
FIG. 2 is a cross-sectional view showing relative positions of a roll, tool and shank cutter according to the invention taken along the groove axis.
Figure 3:
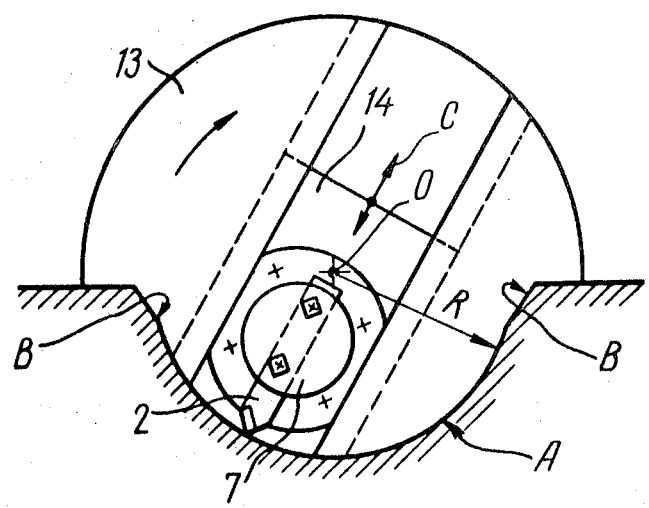
FIG. 3 is a schematic diagram of tool motions which occurring in the process of machining the groove contour central arcuate portion according to the invention taken in the roll radial section.
Figure 4:
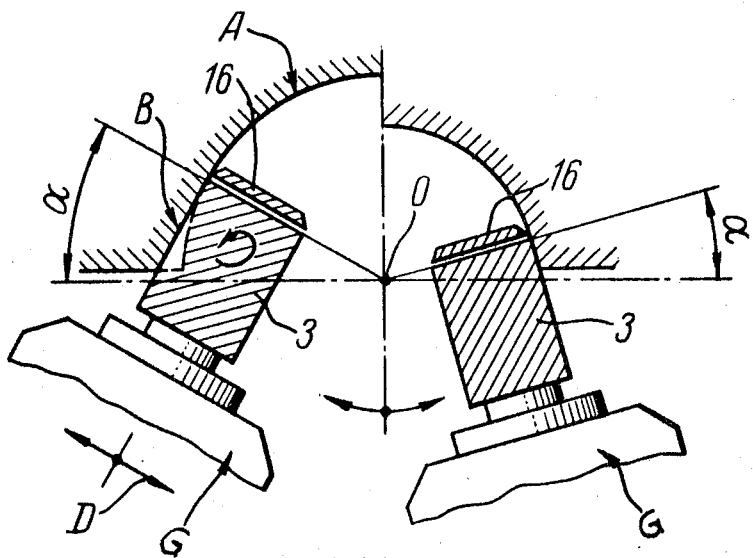
FIG. 4 is a diagrammatic view of shank cutter motions occurring in the process of machining the groove contour bevel flanks according to the invention taken in the roll radial section.

According to the invention, while a roll 1 (FIG. 2) being machined is in rotary feed movement, groove central portion A (FIG. 3) defined by the arc having radius R is machined by a tool 2 which is rotated around geometrical center O of this arc. Distance $t_1$ (FIG. 1) from axis $O_2$ of roll rotation towards geometrical center O is constant. As radius R changes in subsequent radial sections of the groove, the tool receives radial feed C and bevel flanks B (FIGS. 1 and 4) are alternatively machined by a shank cutter 3 which is turned around geometrical center O in the groove radial section plane and simultaneously moved in radial direction D until bevel flank B being machined conjugates with the arc of groove central portion A in accordance with the variation of bevel flank angle $\alpha$.

Figure 5:
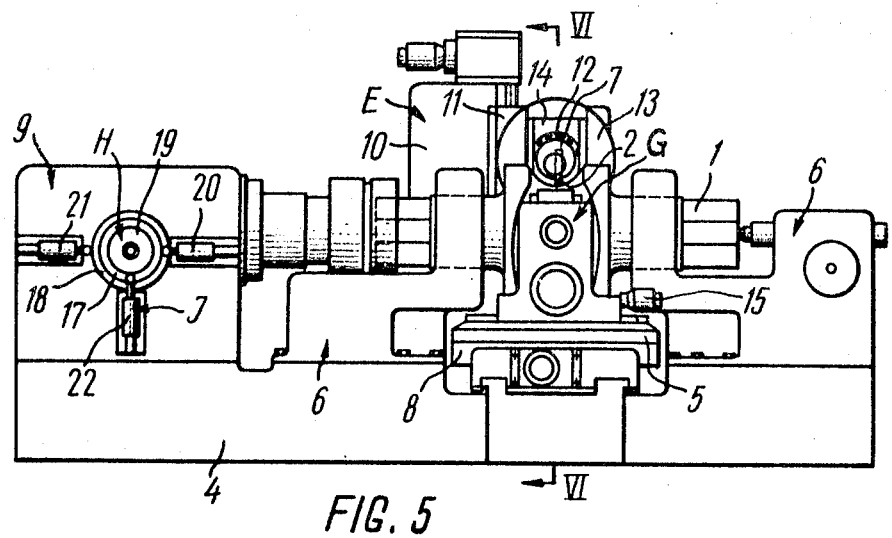
FIG. 5 shows a general view of the machine for machining grooves in rolls of hot pilger mills according to the invention.

A machine is provided for effecting this method. The machine comprises a revolving table 5, means 6 for supporting the roll 1 being grooved together with a drive for its rotating and means E for clamping a tool holder 7 with all such elements being mounted on a bed or frame 4 (FIG. 5).

According to the invention, on bed 4 in horizontal guideways is a slide 8 for the accommodation of revolving table 5 thereon having an operative connection with a drive 9 for rotating the roll and carrying guideways with a cutter head G. A cutter arranged for travelling in these guideways is mounted at its one end with respect to means 6 for supporting the roll being grooved, and a post or stand 10 having vertical guideways with a means E mounted therein for clamping the tool holder 7 is arranged at the other opposite end of the bed. Means E comprises a boring head or stock 11 adapted for moving along vertical guides of post 10 having a spindle 12 and a chuck 13 provided with guideways for a chuck rest 14 carrying the tool holder 7 and the tool 2.

To ensure an even conjugation of bevel flanks B with arc A of the groove central portion, cutter head G (FIG. 2) with cutter 3 has an independent drive 15 (FIG. 5) for moving it in the radial direction which is operated by signals from cutter position sensor 16 (FIGS. 2 and 4) arranged at the end of cutter 3 and being in contact with arc A of the groove central portion.

To provide for feeding movements of table 5, chuck rest 14 and boring head 11 the machine has masters or forms H (FIG. 5) adapted for synchronous rotation with roll 1 being grooved and master angle sensors I contacting them.

Masters H comprise three forms of masters 17, 18 and 19 mounted on a single common shaft and rotating in synchronism with roll 1 being grooved.

The number of sensors I corresponds to the number of masters H. In this case there are three sensors 20, 21 and 22.

The table, chuck rest and boring head are driven by any suitable conventional servo drives (not shown) which are arranged in the vicinity thereof e.g., via a short, a screw and a nut kinematic coupling. This arrangement of servo drives ensures a high static and dynamic rigidity of the feeding drives.

Figure 7:
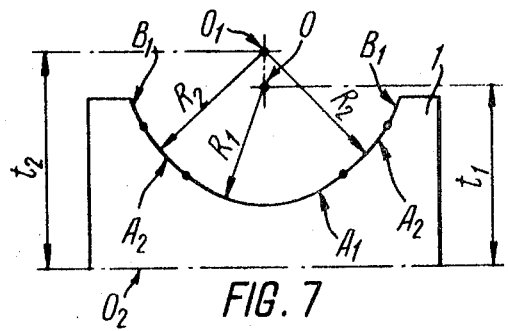
FIG. 7 is a schematic view of the groove contour having inclined straight portions conjugated with the central portion by additional arcs according to the invention taken in the roll radial section.

The present machine is able to machine bevel flanks of the groove contour which comprise inclined straight line portions B (FIG. 7) each being conjugated with the central portion A by means of an additional arc $A_2$. These additional arcs $A_2$ are machined by the same tool 2 used to machine arc A of the central portion and which is rotated around geometrical center O common for these arcs and movable in the radial direction with reference to axis $O_2$ of rotation of roll 1. Thus, distance $t_2$ from axis $O_2$ of roll rotation to geometrical center O is variable, whereas distance $t_1$ from axis $O_2$ of roll rotation to the geometrical center encountered during machining arc $A_1$ is constant.

As radius $R_2$ of additional arcs $A_2$ changes, the tool is given the same radial feed C as that used for machining arc A of the groove contour central portion.

The machine operates as follows.

Figure 6:
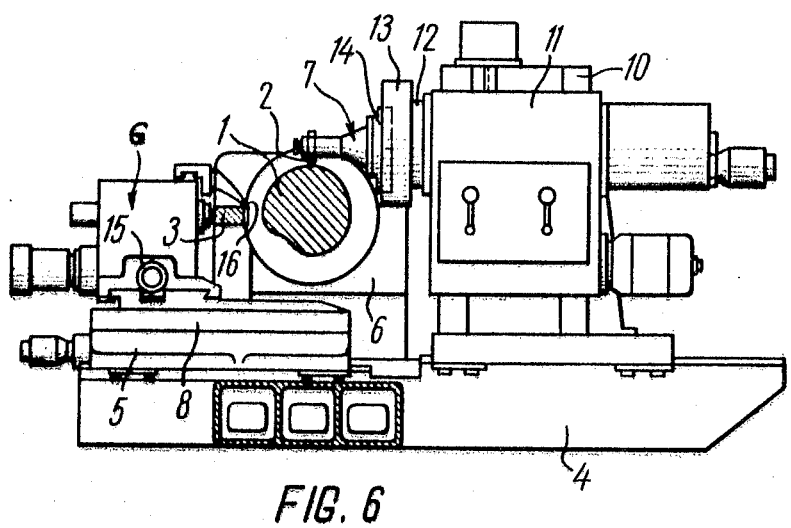
FIG. 6 is a sectional view taken along the line VI—VI of FIG. 5.

During machining the central portion of the groove contour defined by arc A (FIG. 1), roll 1 (FIG. 5)

which is supported by means 6 is set into a rotary feed motion by drive 9. At the same time, spindle 12 of boring head 11 (FIG. 6) starts rotating, with the axis of the spindle being in alignment with geometrical center O (FIG. 1) of arc A of the roll groove contour. Spindle 12 (FIG. 6) transfers the rotation to tool holder 7 and tool 2 by means of chuck 13.

In accordance with the variation of radius R (FIG. 1) of arc A of the groove central portion, chuck rest or support 14 is given a radial feed C, and the feed is thus also received by tool holder 7 and tool 2.

Thus, the copying is carried out by feed operations, and this permits an increase in the cutting speed, i.e., tool turning speed, and consequently the reduction of the roll groove machining time.

The cutting is effected along arc A in the radial section of the roll, and makes possible the use of carbide-faced tools with a normal rake angle. As a result, a higher cutting speed and better surface finish can be obtained. Besides, such machining (along arc A in the roll radial section) allow a continuous dimension control of the machined groove and the introduction of corrections to compensate for the tool wear, and thus excludes the groove contour distortion and additional grinding.

The radial feed of chuck rest 14 is controlled by signals from sensor 21 (FIG. 5) via its servo drive. Sensor 21 is in constant contact with master or form 18 whose contour exactly corresponds to that of the groove in the roll axial section and which rotates in synchronism with roll 1 being grooved.

During machining, the bevel flanks of the groove contour which is carried out in a step-by-step manner, roll 1, in the same away as during machining the central portion defined by arc A, performs a rotary feed movement. In process of its rotation, in accordance with the variation of slope angle (FIG. 4) of the bevel flank table 5 (FIG. 6) carrying a cutter head G with a cutter 3 is driven around its axis of rotation aligned with geometrical center O (FIG. 4) of arc A of the groove contour central portion.

The rotary movement of table 5 is controlled by signals from sensor 20 (FIG. 5) via its servo drive. Sensor 20 is in contact with master 17 which rotates in synchronism with roll 1 being grooved.

The machining of bevel flanks by a highly efficient tool, a cutter in this case, throughout its entire breadth in one operation considerably reduces the machining time and improves the surface finish.

Simultaneously, as radius R (FIG. 4) of arc A of the groove contour central portion changes, cutter head G and thus cutter 3 are moved along the guideways of table 5 (FIG. 2) in a radial direction D (FIG. 4) until bevel flank B being machined conjugates with arc A of the groove central portion.

The radial movement of cutter head G is controlled by signals from sensor 16 via an independent drive. Sensor 16 is arranged at the end of cutter 3 and contacts arc A of the groove central portion.

Such control of the radial movements of cutter head G provides for an even and smooth conjugation of bevel flanks B with arc A of the groove contour central portion of roll 1.

The machining of the groove having a contour with bevel flanks which comprise inclined straight line portions $B_1$ (FIG. 7) each being conjugate with the contour central portion by an additional arc $A_2$ is carried out in the following sequence.

The groove contour central portion defined by arc $A_1$ is machined first, as has been described in connection with machining the central portion defined by arc A (FIG. 1). When additional arcs $A_2$ (FIG. 7) are machined in a manner similar to machining arc $A_1$, but in this case, the geometrical center of arcs $A_2$ is in point $O_1$ movable in the radial direction with reference to axis $O_2$ of roll rotation during machining these arcs, i.e., distance $t_2$ is variable.

The afore-said movement of geometrical center $O_1$ occurs in accordance with the variation of radius $R_2$ of arc $A_2$ due to the movements of boring head 11 (FIG. 6) in the vertical guideways of post or stand 10, and thereby causes a shift of the rotation axis of tool 2 in the radial direction with reference to axis $O_2$ (FIG. 7) of roll rotation.

The movements of head 11 are controlled by signals from sensor 22 contacting master 19.

Now, inclined straight portions $B_1$ of bevel flanks of the groove contour are machined, as has been described above in connection with the machining of inclined straight portions B (FIG. 1), by cutter 3 (FIG. 4) until these inclined straight portions are conjugate with additional arcs $A_2$.

Since rolls grooved on the machine according to the invention have a progressive groove contour or stepped surface, the productive capacity of hot pilger mills may be increased and the quality of the milled pipes or tubes may be improved.

It should be mentioned that the proposed method of machining grooves in rolls of hot pilger mills and the machine for effecting this method, while providing for higher accuracy and better surface finish of the grooved roll, increase the machining efficiency by 2.5 to 3 times as compared with conventional methods and machines making use of a turning technique of grooving rolls.

What is claimed is:

1. A method of machining grooves in rolls of hot pilger mills wherein a roll contour varies with the rotation of the roll being grooved in a machining zone and has an arc-defined central portion and bevel flanks conjugated by said arc in each radial section, comprising imparting a rotary feed movement to said roll; machining said contour arc-defined central portion of the groove being machined by a tool rotated around a fixed geometrical center of said arc, feeding the tool radially as the radius varies in subsequent radial sections of said groove; alternatively machining said bevel flanks by a shank cutter; rotating said shank cutter in the radial section plane of the groove being machined around said geometrical center and simultaneously moving said cutter in the radial direction until said bevel flank being machined conjugates with said arc of said groove central portion in accordance with the bevel flank angle variation.

2. The method according to claim 1, comprising machining bevel flanks of said groove contour of the roll being machined in the form of inclined straight-line portions each inclined straight portion of said inclined straight-line portions being conjugated with the central portion of said groove contour by means of an additional arc; machining all said additional arcs simultaneously by a tool rotated around a geometrical center common for these arcs and movable in the radial direction with reference to the axis of rotation of said roll and, giving said tool a radial feed as the radius of said additional arcs changes in the process of rotation of said roll,.

* * * * *